United States Patent
Adair, Jr.

[11] Patent Number: 5,214,910
[45] Date of Patent: Jun. 1, 1993

[54] DUAL MODE ACCESSORY POWER UNIT
[75] Inventor: John W. Adair, Jr., Tequesta, Fla.
[73] Assignee: United Technologies Corporation, Hartford, Conn.
[21] Appl. No.: 709,268
[22] Filed: Jun. 3, 1991
[51] Int. Cl.$^5$ ................................................ F02C 6/00
[52] U.S. Cl. .................................. 60/39.15; 60/39.181
[58] Field of Search ............ 60/39.142, 39.15, 39.181, 60/39.83

[56] References Cited
U.S. PATENT DOCUMENTS

| 2,643,511 | 6/1953 | Briggs | 60/39.142 |
|---|---|---|---|
| 2,655,788 | 10/1953 | Sedille | 60/39.15 |
| 2,814,181 | 11/1957 | Schwartz | 60/39.15 |
| 3,242,347 | 3/1966 | Dotson | 60/39.15 |
| 4,387,562 | 6/1983 | Takao et al. | 60/39.15 |
| 4,759,178 | 7/1988 | Joy | 60/39.181 |
| 4,872,307 | 10/1989 | Nakhamkin | 60/39.15 |
| 5,069,031 | 12/1991 | Shekleton et al. | 60/39.142 |

FOREIGN PATENT DOCUMENTS 1082511 12/1954 France .
0025038 2/1984 Japan .

Primary Examiner—Richard A. Bertsch
Assistant Examiner—Howard R. Richman

[57] ABSTRACT

An accessory power unit for a vehicle, such as an aircraft, which can be driven by either of two turbines—a first turbine driven by high pressure hydrogen gas bled from the vehicle propulsion system, or a second turbine driven by a separate gas generator.

3 Claims, 1 Drawing Sheet

DUAL MODE ACCESSORY POWER UNIT

The invention was made under a U.S. Government contract and the Government has rights herein.

FIELD OF THE INVENTION

This invention relates to accessory power units for driving hydraulic pumps and electrical generators on aircraft.

BACKGROUND OF THE INVENTION

An accessory power unit (APU) is typically used on vehicles, such as aircraft, to drive the vehicle's hydraulic pumps and electrical generators. Such APU's are typically driven by working fluid bled from the engine of the vehicle during normal operation, or may be operated by a hydrazine powered turbine. Powering an APU from either of these sources incurs certain penalties. Powering the APU with working fluid bled from the vehicle's engine reduces the working fluid available to the engine thereby reducing the engine's efficiency. Relying on hydrazine to power the APU incurs a weight penalty due to the added weight of the tanks of hydrazine. Thus, either method of driving the APU's of the prior art significantly impacts the vehicle's efficiency.

What is needed is an accessory power unit system that minimizes the penalties on engine operating efficiency and weight of a vehicle.

DISCLOSURE OF THE INVENTION

It is therefore an object of the present invention to minimize the weight and the impact on engine operating efficiency of a vehicle's APU.

According to the present invention an accessory power unit is disclosed which is operable in two modes. In the first mode, the APU is powered by pressurized, gaseous propellant from the engine fuel line. The gaseous propellant is expanded through a turbine which drives the APU, and then returned to the engine fuel line to be combusted in the engine. If the power from the expanding fuel from the engine is insufficient to adequately power the APU or the engine is not operating, the APU is operated in the second mode, in which a gas generator, fueled by pressurized hydrogen and pressurized liquid oxygen, drives a second turbine which supplements the power of the first turbine to drive the APU at the desired power level.

PREFERRED EMBODIMENT OF THE INVENTION

Figure 1:
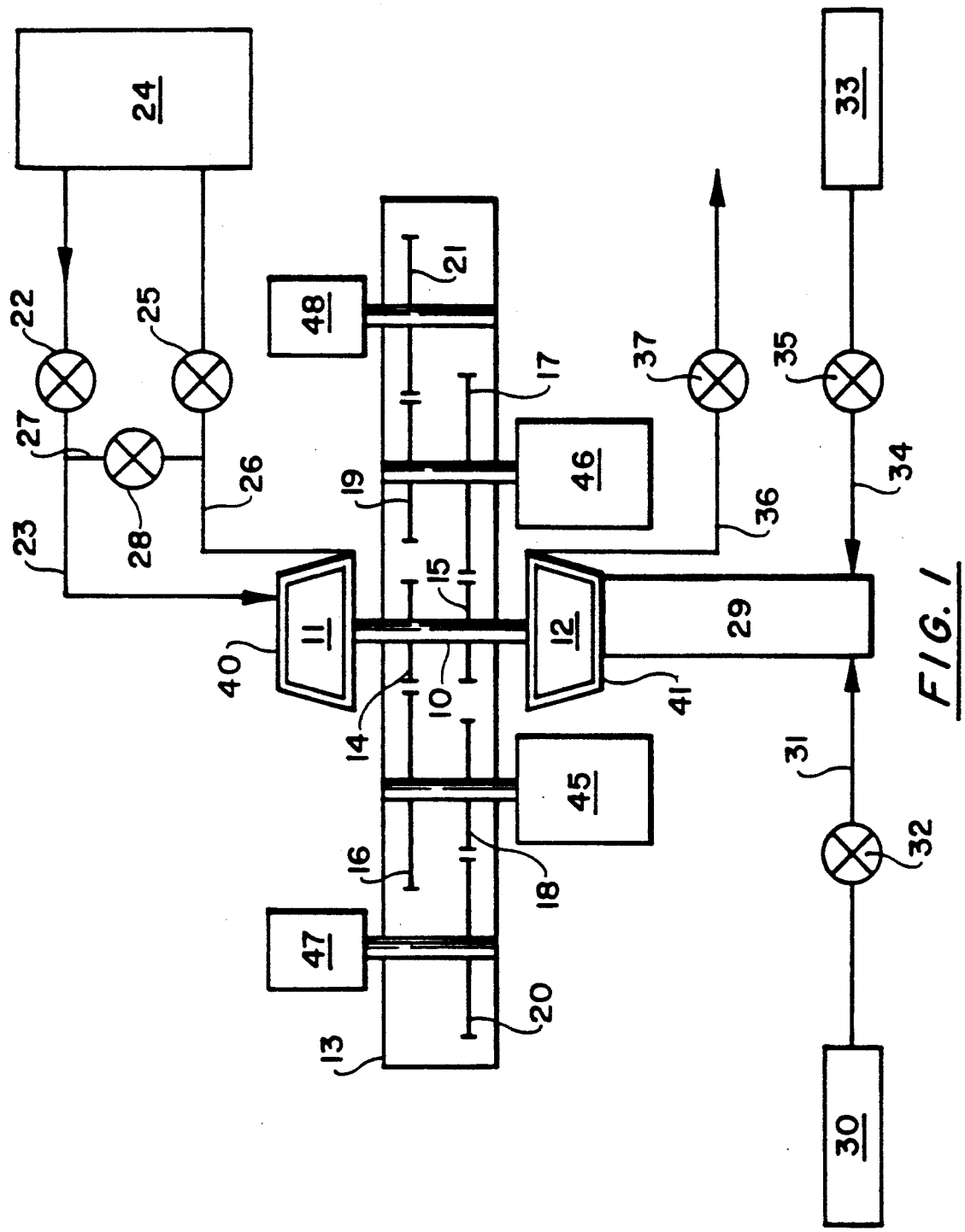
FIG. 1 is a schematic view of the dual mode accessory power unit system of the present invention.

As shown in FIG. 1, the accessory power unit of the present invention includes a turbine shaft 10 powered by a power expander turbine 11 and a gas generator turbine 12 which are independently capable of driving the accessories 45, 46, 47, 48. The shaft 10 extends through a gearbox 13 within which the shaft gears 14, 15 either directly, or indirectly, drive the gears 16, 17, 18, 19, 20, 21 of the electrical generators 45, 46 and hydraulic pumps 47, 48 therein.

A first working fluid, such as pressurized hydrogen gas, is provided to the power turbine housing 40 through the power turbine supply control valve 22 in the power turbine supply line 12. The hydrogen gas is preferably diverted from the engine thermal management system 24, which may include a regenerative cooling system in which liquid hydrogen is used to cool engine components, thereby vaporizing the hydrogen into a high pressure gas. After expanding through the power turbine 11, the hydrogen gas exits the power turbine housing 40 through a power turbine discharge control valve 25 in the power turbine discharge line 26 which returns the expanded hydrogen to the engine thermal management system 24. The control valves 22, 25 regulate the flow of hydrogen to and from the power turbine 11. A bypass line 27 having a bypass control valve 28 connects the supply and discharge lines 23, 26 to adjust flow of hydrogen through the power turbine 11 at various engine operating conditions to control the shaft 10 to a constant speed.

The second working fluid, to drive the gas generator turbine 12, is supplied to the gas generator turbine housing 41 by a gas generator 29 located adjacent thereto. Oxidizer, such as pressurized liquid oxygen, is supplied to the gas generator 29 from a pressurized oxidizer system 30 through an oxygen supply line 31 controlled by an oxygen control valve 32. Fuel, such as pressurized hydrogen, is supplied to the gas generator 29 from a pressurized hydrogen source 33, which may be fed by the aircraft reaction control system or other pressurized system, through a hydrogen supply line 34 controlled by a hydrogen control valve 35. The combustion gas from the gas generator 29 flows to the gas generator turbine housing 41, is expanded through the gas generator turbine 12, and is exhausted through an exhaust line 36. An exhaust control valve 37 in the exhaust line 36 provides the capability to shut off the exhaust when the gas generator is not in operation. The hydrogen control valve 35 and the oxygen control valve 32 provide adjustment of the flow of the second working fluid through the gas generator turbine 12 to control the gearbox shaft 10 speed.

In operation, the APU is powered by expanding hydrogen gas directed from the engine thermal management system 24 (i.e. regenerative cooling using liquid hydrogen) through the power turbine 11 when the engine is operating. When the engine is not operating, or is producing insufficient power to drive the generators 45, 46 and hydraulic pumps 47, 48, the APU is driven by the combustion products of the gas generator 29. Use of hydrogen from the engine thermal management system 24 saves propellant weight since the hydrogen is burned in the engine after powering the APU. The addition of a gas generator 29 expands the APU operating envelope allowing operation of the APU throughout a broader aircraft flight regime or when the engine is shut down. Thus, adding the dual mode capability saves weight by meeting power requirements with a single set of power system components.

Although this invention has been shown and described with respect to detailed embodiments thereof, it will be understood by those skilled in the art that various changes in form and detail thereof may be made without departing from the spirit and scope of the claimed invention.

I claim:

1. An accessory power unit for driving accessory systems of a vehicle comprising:
   a turbine shaft;
   first and second turbines attached to the turbine shaft;

means for selectively driving the first turbine with a first working fluid comprising a first turbine housing, a first supply line for supplying the first working fluid to the first turbine housing, a first discharge line for discharging the first working fluid from the first turbine housing, said first supply line and said first discharge line communicating through the first turbine, and means for controlling flow of the first working fluid through the first supply and first discharge lines comprising a supply control valve in the first supply line, a discharge control valve in the first discharge line, and a bypass control valve in a bypass line, said bypass line connecting the first supply line to the first discharge line;

means for selectively driving the second turbine with a second working fluid independent of the means for selectively driving the first turbine comprising a second turbine housing, a gas generator connected to the second turbine housing for supplying the second working fluid to the second turbine housing, an oxidizer supply line connected to the gas generator for supplying oxidizer thereto, a fuel supply line connected to the gas generator for supplying fuel thereto, a second discharge line for discharging the second working fluid from the second turbine housing, said gas generator and said second discharge line communicating through the second turbine, and means for controlling flow of the oxidizer and the fuel to the gas generator; and means for utilizing rotation of the turbine shaft to drive said systems.

2. The accessory power unit of claim 1 wherein the first working fluid is hydrogen and the second working fluid includes the combustion products of hydrogen and oxygen.

3. The accessory power unit of claim 1 wherein the first and second turbines are attached to the turbine shaft adjacent opposite ends thereof, the first working fluid is hydrogen and the second working fluid includes the combustion products of hydrogen and oxygen.

* * * * *

UNITED STATES PATENT AND TRADEMARK OFFICE
CERTIFICATE OF CORRECTION

PATENT NO. : 5,214,910

DATED : June 1, 1993

INVENTOR(S) : John W. Adair, Jr.

It is certified that error appears in the above-identified patent and that said Letters Patent is hereby corrected as shown below:

In column 2, line 1, "12" should read --23--.

Signed and Sealed this

Third Day of May, 1994

Attest:

BRUCE LEHMAN

Attesting Officer

Commissioner of Patents and Trademarks